United States Patent [19]

Wilson et al.

[11] Patent Number: 4,603,027

[45] Date of Patent: Jul. 29, 1986

[54] REMOVABLE TOP NOZZLE AND TOOL FOR A NUCLEAR REACTOR FUEL ASSEMBLY

[75] Inventors: John F. Wilson, Murrysville; Samuel Cerni, Churchill; Robert K. Gjertsen, Monroeville, all of Pa.

[73] Assignee: Westinghouse Electric Corp., Pittsburgh, Pa.

[21] Appl. No.: 564,058

[22] Filed: Dec. 21, 1983

[51] Int. Cl.⁴ .................................................. G21C 3/32
[52] U.S. Cl. ............................ 376/446; 376/449; 376/451; 376/440
[58] Field of Search ............... 376/446, 449, 451, 440

[56] References Cited

U.S. PATENT DOCUMENTS

| | | | |
|---|---|---|---|
| 4,030,975 | 6/1977 | Anthony | 376/446 |
| 4,219,386 | 8/1980 | Osborne | 376/446 |
| 4,416,848 | 11/1983 | Feutrel | 376/446 |

*Primary Examiner*—Donald P. Walsh

[57] ABSTRACT

A top nozzle subassembly having a hold-down device incorporated therewithin is provided for a nuclear reactor fuel assembly. The subassembly is slidably mounted on the upper ends of the control rod guide thimbles and is removably attached by internally threaded collars which threadably mate with external threads provided on the upper ends of the guide thimbles. Unthreading of the collars allows the subassembly to be removed from the fuel assembly to gain top access to the fuel rods within the fuel assembly. The invention also includes a special tool for threading and unthreading of the collars.

7 Claims, 9 Drawing Figures

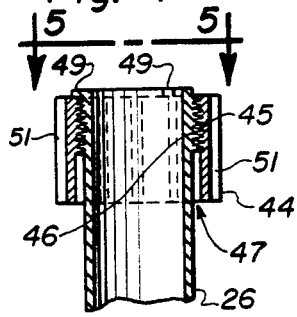
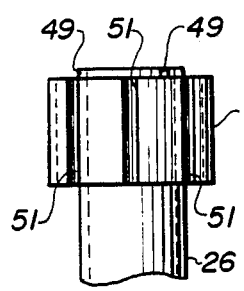
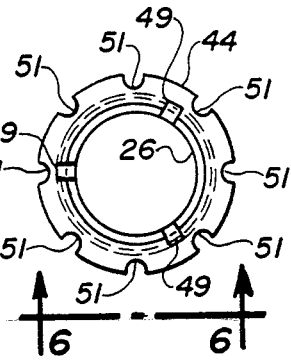
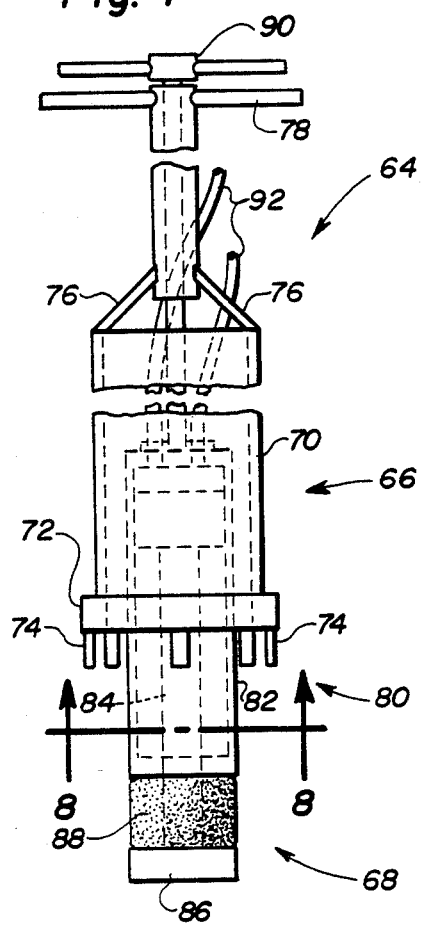
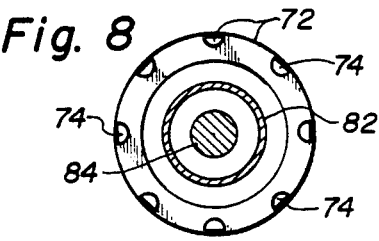
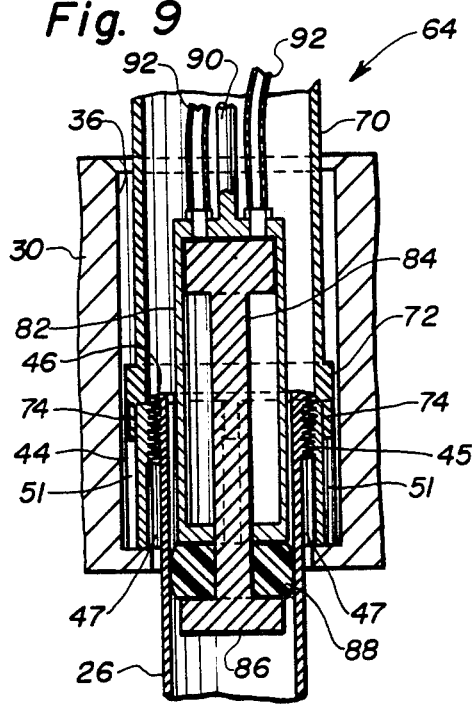

REMOVABLE TOP NOZZLE AND TOOL FOR A NUCLEAR REACTOR FUEL ASSEMBLY

CROSS REFERENCE TO RELATED APPLICATIONS

Reference is hereby made to the following copending applications dealing with related subject matter and assigned to the assignee of the present invention:

1. "Reconstituting A Nuclear Reactor Fuel Assembly" by Robert K. Gjertsen, John F. Wilson, and John M. Shallenberger; U.S. patent application Ser. No. 564,056, filed Dec. 21, 1983.

2. "Nuclear Reactor Fuel Assembly With Fuel Rod Removal Means" by Robert K. Gjertsen, John F. Wilson, and Walter F. Weiland; U.S. patent application Ser. No. 545,419, filed Oct. 25, 1983.

3. "Nuclear Reactor Fuel Assembly With Improved Top Nozzle And Hold Down Means", by Robert K. Gjertsen and Luciano Versonesi; U.S. patent application Ser. No. 542,625, filed Oct. 17, 1983.

BACKGROUND OF THE INVENTION

The present invention relates generally to fuel assemblies for nuclear reactors and, more particularly, is directed to a top nozzle subassembly having hold-down means incorporated therewithin and which is removably mounted on the upper end portions of its control rod guide thimbles.

In most nuclear reactors the core portion is comprised of a large number of elongated fuel elements or rods grouped in and supported by frame works referred to as fuel assemblies. The fuel assemblies are generally elongated and receive support and alignment from upper and lower transversely extending core support plates. These upper and lower core support plates are directly or indirectly attached to a support barrel which surrounds the entire core and extends between the ends thereof. In the most common configuration, the axis of the core support barrel extends vertically and the various fuel assemblies are also arranged vertically resting on the lower support plate. To facilitate handling and installation, the fuel assemblies are generally not secured to the lower core support plate.

Temperatures at various times within the core may vary greatly, such as, from cold shutdown to normal operating conditions. It is also a well known fact that different materials exhibit different thermal growth characteristics. Therefore, since the materials used in the vertically extending support structures of the fuel assemblies are generally different than those used in the core support barrel, the thermal expansion of these various members in the axial or vertical direction may be quite significant, particularly, at the high temperatures found within the core and the axial length of some of the members. For these reasons, the fuel assemblies are not usually attached to the upper and lower core plates but rather are supported in a manner which permits some relative motion therebetween. The axial thermal expansion differential between the fuel assemblies and the core support barrel has been accommodated by insuring that the axial spacing between the upper and lower core support plates is somewhat greater than the axial length of the fuel assemblies. Normally, this is accomplished by providing an axial gap between the top of the fuel assemblies and the upper core support plate. Over the years, the axial gap spacing had to be increased due to the increasing temperatures in the core region, the increased length and different construction of the fuel assemblies, as well as from the use of different materials, such as Zircaloy. This axial gap spacing not only requires critical design tolerances and precise positioning of the upper core plate over the fuel assemblies, but also, as felt by many designers, permits crossflow of the upwardly flowing coolant in this upper region, subjecting some of the core elements to a potentially damaging sideload.

Generally, in most reactors, a fluid coolant such as water, is directed upwardly through apertures in the lower core support plate and along the fuel rods of the various fuel assemblies to receive the thermal energy therefrom. The physical configuration of the fuel assemblies is such that the coolant may experience a significant pressure drop in passing upwardly through the core region. This pressure drop necessarily produces a lifting force on the fuel assemblies. In some instances, the weight of the fuel assembly is sufficient to overcome the upward hydraulic lifting forces under all operating conditions; however, this is often not the case, particularly when the coolant density is high, as at reactor startup, and additionally because of increasing coolant flow rates. When the hydraulic forces in the upward direction on a particular fuel assembly are greater than the weight of that fuel assembly, the net resultant force on the fuel assembly will be in the upward direction, causing the assembly to move upward into contact with the upper core plate. This upward motion of the fuel assembly, if uncontrolled, may result in damage to the fuel assembly and the fuel rods or to the upper core plate and must, therefore, be avoided. In order to prevent hydraulic lifting of the fuel assemblies, various hold-down devices have been developed.

One such hold-down device, as seen in U.S. Pat. No. 3,379,619, employs the use of leaf springs. The leaf springs are disposed in the axial gap, between the top of the fuel assembly and the upper core plate, which has been provided to accommodate for the thermal expansion of the fuel assembly. More particularly, the leaf springs are attached to the top flange of an enclosure structure having upstanding sidewalls and a bottom adapter plate, with the adapter plate being attached to the upper ends of the control rod guide thimbles. The leaf springs are held in a state of compression within the axial gap and cooperate with the upper core plate to prevent the fuel assembly from being moved upwardly, by the hydraulic lifting forces of the coolant, into damaging contact with the core plate, while, at the same time, allowing for thermal expansion of the fuel assembly into the axial gap. The integrally formed top flange on the enclosure not only provides a physical location for mounting the leaf springs, but also, provides a surface for alignment holes that interface with pins projecting down from the upper core plate. In addition, the enclosure: provides convenient means for physically handling the fuel assembly during installation and removal; protects the fuel assembly from side loading; and, one of its primary purposes, channels the fluid coolant upwardly to prevent crossflow at the top portion of the fuel assembly. Although, the leaf spring hold-down device has many advantages, it necessitates the requirement of an axial gap to provide for thermal expansion, and further, requires physical space for mounting the leaf springs. In some fuel assemblies, especially in some of the more newer designs with different fuel rod arrangements and configurations, there is not sufficient physical space to mount the leaf springs.

Another type of hold-down device, such as the one shown in the Klumb et al patent (U.S. Pat. No. 3,770,583), employs the use of coil springs. The device basically includes coil springs disposed about upright alignment posts having one end threadably secured to the top end plate of a fuel assembly, which in turn, is mounted on the upper ends of the control rod guide tubes. A hold-down plate is slidably mounted on the alignment posts and the coil springs are interposed between the two plates. The upper ends of the alignment posts are radially enlarged to form shoulders for retaining the hold-down plate on the posts. In use, the coil springs bias the hold-down plate upwardly against a core alignment plate to provide a downward force on the fuel assembly. To accommodate for thermal expansion of the fuel assembly, it is mandatory that aligned clearance holes be provided in the upper core plate for upward movement of the enlarged shoulders of the alignment posts. Machining of such clearance holes is not only costly, but also weakens the upper core plate structure. Furthermore, the arrangement lacks an enclosure structure to prevent crossflow of the coolant in the upper region of the fuel assembly.

Two modified versions of the coil spring hold-down device seen in the Klumb et al patent, can be seen in FIGS. 3 and 3a of the Anthony patent (U.S. Pat. No. 4,192,716). The version represented in FIG. 3 is essentially the same as the Klumb et al device, with the difference being the provision of an axial gap between the top of the fuel assembly and the upper core plate. The FIG. 3a version also requires an axial gap spacing to accommodate for thermal expansion. Hydraulic lift is prevented by coil springs, seated in cavities in the upper core plate, that cooperate with an alignment pin arrangement. Both of these versions suffer from some of the same shortcomings as the Klumb et al device in addition to the disadvantages associated with an axial gap spacing.

SUMMARY OF THE INVENTION

Briefly stated, the present invention is directed towards a nuclear reactor fuel assembly having a bottom nozzle, at least one longitudinally extending control rod guide thimble attached to and projecting upwardly from the bottom nozzle, a plurality of transverse grids axially spaced along the guide thimble for supporting an array of up standing fuel rods, and a top nozzle subassembly adapted to be attached to the upper end portion of the guide thimble for completing the assembly as an integral unit. The top nozzle includes hold-down means incorporated therewithin in providing a hold-down force to prevent hydraulic lifting of the fuel assembly caused by upward coolant flow while allowing for changes in fuel assembly length due to core induced thermal expansion and the like. The construction is such that the fuel assembly can be placed in the core region with its top surface in direct contact with the upper core plate in thereby eliminating the potential of coolant crossflow in the axial gap spacing required by some of the prior art units and the provision of costly machined cavities in the upper core plate to accommodate for thermal expansion in other ones of the prior art units. Still further, the top nozzle subassembly is so attached on the upper end portions of the guide thimbles such that it can be easily removed therefrom as a contained unit to gain top access to the upstanding fuel rods.

The top nozzle subassembly basically comprises a coil spring disposed about the upper end of the guide thimble and sandwiched between a lower adapter plate and an upper hold-down plate. The lower adapter plate is slidably mounted on the guide thimble and restably supported by a retainer, mounted on the guide thimble, which limits its downward movement. The upper hold-down plate has a guide thimble passageway with an internal ledge defined therewithin for receiving the thimble so as to mount the hold-down plate on the thimble for slidable movement therealong. A collar threaded on the upper end of the guide thimble is disposed within the passageway of the hold-down plate and cooperates with the internal ledge to limit the upward movement of the hold-down plate along the guide thimble. The construction is such that the terminal upper end of the guide thimble, along with the collar, are permitted to reciprocate within the passageway of the hold-down plate, thus allowing for thermal growth of the guide thimble. Hydraulic lifting forces are yieldably transmitted downwardly on the fuel assembly.

In the preferred embodiment, there are several guide thimbles, separate guide thimble extensions connected to the upper ends of each of the guide thimbles, and the top nozzle subassembly is attached to the thimble extensions. Preferably, the coil springs are preloaded, being held in compression between the lower adapter plate and the upper hold-down plate.

The present invention further includes a tool specifically designed for connecting and disconnecting the collar on the upper end of the guide thimble. More particularly, the tool broadly comprises means for rotating the collar while at the same time preventing the guide thimble from rotating. Specifically, the collar is threaded on and off the threaded end of the guide thimble by an elongated hollow tube having a peripheral rim at one of its ends with engaging lugs mounted thereon which are inserted into axial grooves provided in the collar. The thimble is prevented from rotating by gripper means which includes fluid power means, preferably in the form of a hydraulic cylinder having a double actuated piston rod. A flange is mounted on the end of the piston rod and an expandable material, such as polyurethane, is disposed adjacent the flange. When the piston rod is retracted, the flange axially compresses the material against the end of the cylinder, causing the material to expand radially outwardly to frictionally grip the inner wall of the thimble.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is an enlarged sectional view of the internally threaded collar being connected on the externally threaded upper end of the guide thimble, with one locking tab being bent over against the top surface of the collar.

FIG. 5 is a plan view of the collar connection as seen from line 5—5 of FIG. 4, showing three locking tabs.

FIG. 6 is an elevational view of the collar connection, as seen from line 6—6 of FIG. 5, showing the axially extending grooves provided on the peripheral face of the collar and with a short section of the thimble extending above the collar and the locking tabs being in an upright position.

FIG. 7 is a diagrammatic representation of the tool used for connecting and disconnecting the collar on the guide thimble, with the piston rod end of the gripper means being shown in its extended position for insertion into the guide thimble.

FIG. 8 is a sectional view, as taken along line 8—8 of FIG. 7, showing the lugs on the rotation means which engage the axial grooves on the collar.

FIG. 9 is a cross-sectional view showing the lower portion of the connect/disconnect tool, being in operational engagement with the collar and with the piston rod retracted, compressing the expandable material to force it radially outwardly to frictionally grip the inner wall of the guide thimble.

DETAILED DESCRIPTION OF THE INVENTION

Figure 1:
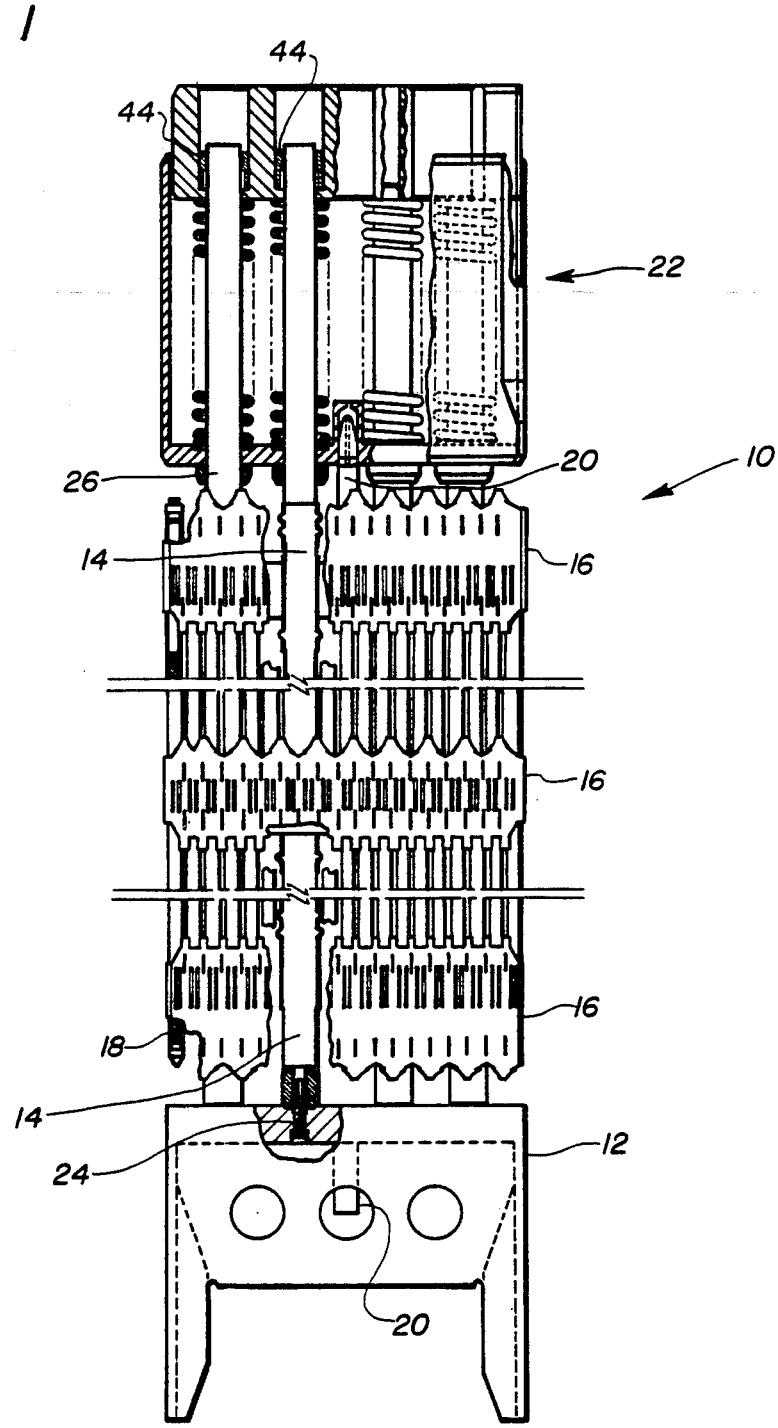
FIG. 1 is a partially sectioned elevational view, with parts being broken away for clarity, of a fuel assembly formed in accordance with the principles of the present invention.

In the following description, like reference characters designate like or corresponding parts throughout the several views. Also, in the following description, it is to be understood that such terms as "forward", "rearward", "left", "right", "upwardly", "downwardly" and the like, are words of convenience and are not to be construed as limiting terms.

In General

Referring now to the drawings, and particularly to FIG. 1, there is shown a partially sectioned elevational view, with parts broken away for clarity, of a fuel assembly constructed in accordance with well known practices, indicated generally by the numeral 10, which incorporates a preferred embodiment of the invention.

The fuel assembly 10 basically comprises a lower end structure or bottom nozzle 12 for supporting the assembly on the lower core plate (not shown) in the core region of a reactor (not shown); an organized array of longitudinally extending control rod guide tubes or thimbles 14 projecting upwardly from the bottom nozzle 12; a plurality of transverse grids 16 axially spaced along the guide thimbles 14; and a plurality of elongated fuel rods 18 (only one of which being shown for clarity) transversely spaced and axially supported by the grids 16. It should be pointed out here that, in this embodiment, the lower ends of the elongated fuel rods 18 are shown being axially held and spaced above the bottom nozzle 12, however, they may be restably supported on the upper surface of the bottom nozzle 12. An instrumentation tube 20 is located at the center of the fuel assembly 10. Attached to the upper ends of the guide thimbles 14 is an end structure or top nozzle with holddown means incorporated therewithin, generally designated by the numeral 22, to form an integral assembly capable of being conventionally handled without damaging the assembly components. A detailed description of the top nozzle subassembly 22 will be provided later on in the specification.

To form the fuel assembly 10, the transverse grids 16 are attached to the longitudinally extending guide thimbles 14 at predetermined axially spaced locations; the fuel rods 18 are inserted from below through the grids 16; the lower nozzle 12 is then suitably attached, such as by machine screws 24, to the lower ends of the guide thimbles; and then the top nozzle subassembly 22 is attached to the upper end portions of the guide thimbles 14. To control the fission process, a plurality of control rods (not shown) are reciprocally movable in the control rod guide thimbles 14 of the fuel assembly 10.

Before describing the top nozzle subassembly 22 in detail, it should be noted that the fuel assembly 10 depicted in the drawings is of the type having a square array (19×19) of fuel rods 18 with sixteen control rod guide thimbles 14 strategically arranged within the fuel rod array. Further, the bottom nozzle 12 and likewise the top nozzle subassembly 22 are generally square in cross-section. In that the specific fuel assembly represented in the drawings is for illustrational purposes only, it is to be understood that neither the shape of the nozzles, or the number and/or arrangement configuration of the fuel rods and guide thimbles are to be limiting, and that the invention is equally applicable to different shapes and arrangement configurations than the ones shown.

Top Nozzle With Hold-Down Means

In the preferred embodiment, each of the control rod guide thimbles 14 have a separate guide thimble extension 26 connected to the upper end of the guide thimble 14 in forming a normal extension to the guide thimble. The guide thimble extension 26, referred to hereafter as thimble extension, is coaxial, has a diameter of substantially the same size as the guide thimble 14, and preferably is connected to the upper end of the guide thimble 14 by a suitable mechanical connection, such as, by bulge fitting which is well known in the art. In the alternative, the thimble extensions 26 may be welded on the guide thimbles 14. In describing the top nozzle with hold-down means 22, reference will be made to the manner in which it is attached to the thimble extension 26, however, it can be appreciated that the top nozzle with hold-down means 22 could be attached in the same manner directly to the upper ends of the thimbles 14 rather than the thimble extensions 26, and thus the principles of the invention are equally applicable to such an arrangement.

Figure 2:
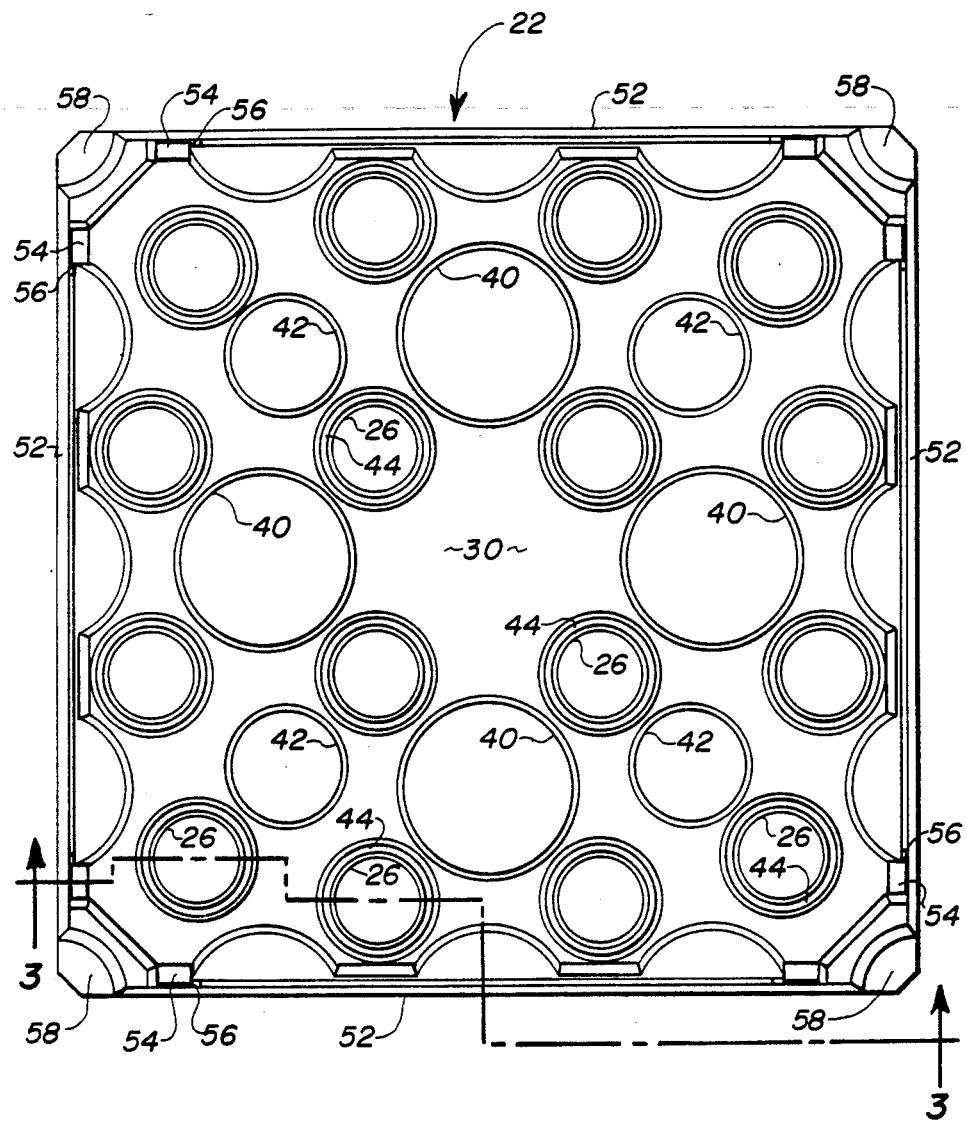
FIG. 2 is an enlarged top plan view of the fuel assembly shown in FIG. 1.
Figure 3:
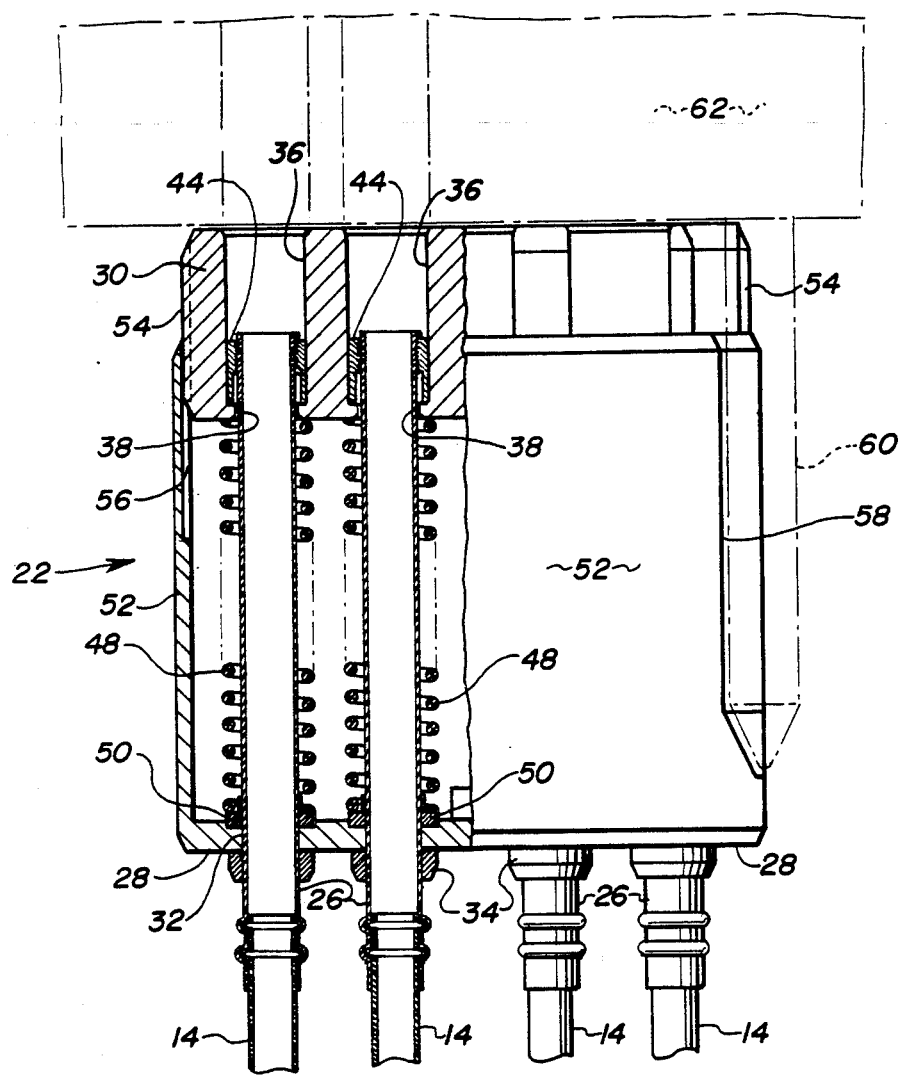
FIG. 3 is an enlarged sectional view, as taken along line 3—3 of FIG. 2, of the top nozzle subassembly, being removed from the fuel assembly, showing the guide thimble extensions being connected to the guide thimbles and with an upper core plate having a downwarding projecting alignment prong, being represented by phantom lines, overlying the top nozzle subassembly to illustrate the mating relationship of an alignment prong with the recesses formed in the corners of the top nozzle subassembly.

As best seen in FIG. 3, the top nozzle with holddown means 22 (referred to hereinafter as a top nozzle subassembly for simplicity) includes a lower adapter plate 28 and a upper hold-down plate 30. The lower adapter plate 28 is of conventional construction formed of a plurality of cross-laced bars (not shown) defining coolant flow openings (not shown) and is provided with a number of thruholes 32 corresponding to the number of thimble extensions 26. The holes 32 are of sufficient dimensional size and are positioned according to the arrangement of the thimble extensions 26 such that the adapter plate 28 can be slidably mounted on the thimble extensions 26. To limit the downward slidable movement of the adapter plate 28 along the thimble extensions 26, a suitable retainer, such as a ring 34 which encircles the thimble extension, is suitably fastened, by brazing or the like, to each of the thimble extensions 26 at a predetermined location, axially spaced above the connection of the thimble extension 26 to the thimble 14. The upper hold-down plate 30 is of a thickness substantially greater than the thickness of the lower adapter plate 28 and is provided with a passageways 36 for receiving the thimble extensions 26. Each passageway 36 has a generally constant larger diameter upper segment and a generally constant smaller diameter lower segment, with the lower segment defining an internal ledge 38 and being slidably engagable with the thimble extension 26. The height of the upper segment is substantially greater than the height of the lower segment of the passageway 36. The passageways 36 are formed in the hold-down plate 30 by a thrubore and a coaxial counterbore of a larger diameter than the diameter of the thrubore, the transition between the thrubore and the counterbore defining the internal ledge 38. As best seen in FIG. 2, the hold-down plate 30 is also provided with a number of relatively large coolant, flow openings 40 and several smaller coolant flow openings 42 positioned at predetermined locations about the plate.

As seen in FIG. 3, and best seen in FIGS. 4,5 and 6, the upper end of each of the thimble extensions 26 is provided with a retainer, preferably in the form of a collar 44 which encircles the end of the thimble extension and is disposed within the upper segment of the passageway 36. In the preferred embodiment, collar 44 is provided with internal screw threads 45 which threadably mate with external screw threads 46 provided on the upper end of thimble extension 26. The internal threads 45 have only been provided on the upper portion of collar 44, the lower portion of collar 44 is unthreaded and of a slightly larger bore to provide an annular gap 47 allowing a small clearance between the collar and thimble extension. The unthreaded portion of the collar 44 serves to align the thimble extension and collar to minimize the possibility of cross threading of the connection. Locking tabs 49 have been provided to prevent loosening of the collar 44 from its threaded connection on thimble extension 26. Vertical cuts are made in the short section of the thimble extension, which extends slightly above the top surface of the collar, to form the tabs 49 which are then bent over against the top surface of collar 44 to prevent relative rotation thereof. To unscrew the collar 44, the tabs 49 are bent to an upright position, or, in the alternative, increased torque is applied to the collar to override the tabs. As noted in FIGS. 1 and 3, the outer diameter of collar 44 is slightly less than the inner diameter of passageway 36 in hold-down plate 30 in thereby providing a close slidably fit of one relative to the other. Thus, in order to gain access to the collar for connection and disconnection, grooves 51 have been provided on the peripheral face of the collar 44. Grooves 51 extend axially, preferably the full height of the collar, and are circumferentially spaced (see FIGS. 5 and 6). As can be appreciated, the abutting engagement of the upper surface of the internal ledge 38 of the hold-down plate 30 passageway 36 with the lower edge of the retainer collar 44 limits the upward slidable movement of the hold-down plate 30 along the thimble extensions 26.

Again referring to FIG. 3, the top nozzle subassembly 22 further includes a coil spring 48 disposed on each of the thimble extensions 26 and interposed between the lower surface of the upper hold-down plate 30 and the upper surface of the lower adapter plate 28. Preferably, the coil springs 48 are held in compression between the upper hold-down plate 30 and lower adapter plate 28 to preload the fuel assembly 10. For proper alignment of the coil springs 48 and to prevent them from contacting their respective thimble extension 26, a spring seat 50 is provided on the lower end of each of the coil springs 48. The spring seats 50 set in recesses or counterbores provided in the upper surface of the lower adapter plate 28. Each of the spring seats 50 have an inner integral upstanding flange that extends between the outer wall of the thimble extension 26 and the inner surface of the spring 48.

As best seen in FIGS. 2 and 3, the preferred embodiment of the top nozzle subassembly 22 further includes upstanding sidewalls 52 formed on the peripheral edge of the lower adapter plate 28 in defining an enclosure (sometimes referred to as an envelope or can) that surrounds the thimble extensions 26 and their associated coil springs 48. As mentioned earlier in the specification, the top nozzle subassembly 22 has a rectangular or square cross-sectional shape, and thus, it follows that the enclosure defined by the upstanding sidewalls 52 has a square cross-sectional shape. Preferably, the hold-down plate 30 also has a square cross-sectional shape and is of a dimensional size slightly less than that of the enclosure 52 so that the hold-down plate 30 can be received within the enclosure 52. In providing proper alignment and to facilitate the insertion of the hold-down plate into the enclosure 52, outwardly projecting alignment tabs 54 (see FIG. 2) are provided on the peripheral edges of the hold-down plate 30 for mating or interfitting engagement with a corresponding number of axially extending guide channels 56 formed on the inner side of the sidewalls 52. Preferably, a pair of transversely spaced guide channels 56 are provided on each of the four sidewalls of the enclosure 52 such that one guide channel on one sidewall and another guide channel on an adjacent sidewall is associated with each of the four corners of the enclosure 52.

In providing lateral support to the fuel assembly 10, when placed in the core region of a reactor (not shown), a depression or recess 58 is formed in the lateral periphery of each of the axial extending corners defined by the sidewalls 52 of the top nozzle subassembly 22. Preferably, the recesses 58 are of a shape or configuration to slidably receive at least a portion of an alignment pin 60, such as the one represented in phantom lines in FIG. 3, that projects downwardly from an upper core plate 62 which overlies the fuel assembly 10.

As shown in FIG. 3, the top nozzle subassembly 22 is attached to the upper end portions of thimbles 14 to form fuel assembly 10 as follows: The retainer rings 34 are first mounted on the thimble extensions 26; the lower adapter plate 28 with its integrally formed sidewalls defining enclosure 52 is lowered down onto the extension thimbles 26, via the holes 32, and is supported on the top surface of the retainer rings 34; the spring seats 50 are inserted over the thimble extensions and seated in the counterbore cavities provided in the top surface of the adapter plate 28; the coil springs 48 are then inserted over the thimble extensions 26 with their lower ends resting on the top of spring seats 50 and radially spaced from the thimble extension by the seat flange; then the upper hold-down plate 30, via passageways 36, is inserted onto the thimble extensions 26, being assisted by tabs 54 mating with the guide channels 56; downward pressure is then applied to compress the springs (initially, springs 48 are in a freestanding condition) to predetermined position wherein a desired spring compressive preload is attained (the span between the hold-down plate 30 upper surface and the adapter plate 28 lower surface is the control); collars 44 are then inserted into the upper segments of passageways 36 and threaded onto the upper externally threaded ends of the thimble extensions 26; the locking tabs 47 are bent over against the top surface of collars 44; and then the pressure is released whereupon the springs expand, forcing the hold-down plate 30 upwardly along the thimble extensions 26 to an axial location wherein the internal ledge 38 abuts collar 44. As seen, the coil springs 48 are held captive, in compression, between the hold-down plate 30 and adapter plate 28 to preload the fuel assembly 10.

Briefly, while still referring to FIG. 3, the operation of the fuel assembly 10 in response to thermal expansion and hydraulic lifting forces is as follows: As the guide thimble 14 and the thimble extensions 26 along therewith grow linearly, due to increased temperatures, the upper terminal end of the thimble extensions 26 with its attached collar 44 move upwardly within the upper segment of passageway 36, and, as the temperature decreases and the thimble and extension retract in length, the terminal end and collar move downwardly within the passageway (reciprocal movement). Now, with regards to hydraulic lifting, should the force of the upward coolant flow tend to exceed the weight of the assembly 10 and the preloaded force of the coil springs 48, the adapter plater 28 tends to move upwardly, further biasing the spring 48 against the hold-down plate 30, resulting in a net downward force applied against the fuel assembly 10.

Now turning to FIGS. 7, 8, and 9, the present invention further includes a tool, being generally designated by the numeral 64, specifically designed for connecting and disconnecting the collar 44 on the upper externally threaded end 46 of thimble extension 26, within the passageway 36 of hold-down plate 30. Referring to FIG. 7, which is a diagrammatic representation, the tool 64 basically comprises rotation means, generally indicated by the numeral 66, engagable with the collar 44 and operable to apply a torque to rotate the collar in one direction for connection and in an opposite direction for disconnection, and gripper means, being indicated generally by the numeral 68, disposed and partly housed within the rotation means 66 for preventing rotation of the thimble extension 26 about its longitudinal axis during threading of collar 44 on and off the thimble extension. More particularly, as best seen in FIG. 7, the rotation means 66 includes an elongated hollow tube 70 having a peripheral rim 72 mounted on the lower end of tube 70. Rim 72 has an outer diameter approximately equal to the outer diameter of the collar 44 in thus permitting the rim 72 to be inserted into the passageway 36 of hold-down plate 30. Mounted to and projecting downwardly from the rim 72 is a number of engaging lugs 74 (also see FIG. 8) adapted to be inserted into the axial grooves 51 of collar 44. The number and circumferential spacing of lugs 74 correspond to the number and spacing of grooves 51. Bracket 76, on the upper end of elongated tube 70, mounts a T-bar handle 78 for manual rotation of means 66.

Still referring to FIG. 7, the gripper means 68, of tool 64, includes fluid power means, preferably in the form of a hydraulic cylinder 80, of conventional construction, having an elongated body portion 82 and a double actuated piston rod 84 operable between an extended position, as seen in FIG. 8, and a retracted position, as seen in FIG. 9. Mounted on the free terminal end of piston rod 84 is a radially extending flange 86 of an outer diameter substantially equal to the outer diameter of the body portion of the cylinder 80. Supported on the piston rod 84 and interposed between the flange 86 and the lower end face of the body portion 82 is an expandable material 88, in the shape of a doughnut. Preferably, the expandable material 88 is polyurethane. A long extending handle 90, having its lower end attached to the upper end face of body portion 82, is provided to support the hydraulic cylinger 80 within the elongated hollow tube 70. Fluid lines 92 interconnect the cylinder 80 to an external power source (not shown) for actuation of the piston rod 84 in a conventional manner.

Briefly, the operation of the connect/disconnect tool 64 will be described in reference to FIG. 9, wherein there is shown a cross-sectional view of the lower portion of tool 64 being in operational engagement with collar 44 and thimble extension 26. As seen, the rotation means 66 and gripper means 68 of tool 64 has been inserted into passageway 36 of hold-down plate 30 with rim 72 of tube 70 being disposed above the top surface of collar 44 and with the lugs 74 being engaged in the axially grooves 51 of the collar, whereas, the lower section of body portion 82, the piston rod 84, flange 86 and expandable material 88 are disposed within the upper end portion of thimble extension 26. It will also be noted in this view that the piston rod 84 is shown in its retracted position whereby the material 88 has been axially compressed between the flange 86 and the lower end face of body portion 82, causing the material to expand radially outwardly to frictionally grip the inner wall of thimble extension 26. With the thimble extension 26 so held (frictionally gripped), the handle 78 of rotation means 66 is rotated in a counter-clockwise direction, applying torque to collar 44 to unloosen the threaded connection of external threads 46 with internal threads 45. Obviously, for connection, handle 78 is rotated in a clockwise direction for reverse torque to thread collar 44 on extension 26. As readily appreciated, the frictional engagement of material 88 holds the thimble extension stationary (prevents rotation) during this rotary connection/disconnection operation, and thereby prevents axial twisting of the thimble extension which is not only destructive to the extension itself, but also such twisting would destroy the connection of the thimble extension 26 with the guide thimble 14. Once the connection or disconnection operation is complete, the piston rod 84 is extended whereby the material 88 transforms back to its normal state (as seen in FIG. 7) and the tool 64 is removed. After collar 44 has been connected as described, and with tool 64 removed, locking tabs 47 are then bent over (as seen in FIG. 5) to insure that collar 44 does not become loosen due to vibration forces and the like. As mentioned earlier, for the disconnection operation, tabs 47 could first be bent upright before the tool 64 is inserted, or, in the alternative, remain in their locking position and be overridden by rotating collar 44.

It is thought that the invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred or exemplary embodiment thereof.

We claim:

1. A fuel assembly for a nuclear reactor including a bottom nozzle, at least one longitudinally extending control rod guide thimble having an upper end and a lower end being attached to the bottom nozzle and projecting upwardly therefrom, a plurality of transverse grids axially spaced along said thimble for supporting an array of upstanding fuel rods, and a top nozzle subassembly removably mounted on the upper end of said guide thimble for obtaining top access to said fuel rods upon removal thereof, said top nozzle subassembly comprising:
   (a) a section integrally formed on the upper end of said guide thimble and having external threads thereon;
   (b) a lower adapter plate having a guide thimble hole for receiving said guide thimble so as to mount said adapter plate on said guide thimble for slidable movement therealong;
   (c) a retainer mounted on said guide thimble for restably supporting and limiting the downward movement of said adapter plate along said guide thimble;
   (d) an upper hold-down plate having a guide thimble passageway with an internal ledge for receiving said thimble so as to mount said hold-down plate on said thimble for slidable movement therealong;
   (e) spring means interposed between said upper hold-down plate and said lower adapter plate for biasing said hold-down plate upwardly when a downward force is applied thereon whereby said downward force is yieldably transmitted to said fuel assembly; and
   (f) a collar disposed within said passageway and in abutment with said ledge, said collar having an internal threaded section engageable with said externally threaded section to move said hold-down plate down against said spring means and thereby mounting of said subassembly on said guide thimble.

2. The fuel assembly as defined in claim 1, wherein said spring means includes a coil spring, said coil spring being coaxially disposed about said guide thimble and held in compression between said upper hold-down plate and said lower adapter plate.

3. The fuel assembly as defined in claim 1, wherein the outer diameter of said collar is slightly less than the inner diameter of said passageway so as to provide a close slidable fit of one relative to the other.

4. The fuel assembly as defined in claim 3, wherein said rotatable means includes at least two circumferentially spaced, axially extending grooves provided on the peripheral edge of said collar.

5. The fuel assembly as defined in claim 4, wherein said grooves are equally spaced and extend the full axial height of said collar.

6. A fuel assembly for a nuclear reactor including a bottom nozzle, at least one longitudinally extending control rod guide thimble having an upper end and a lower end being attached to the bottom nozzle and projecting upwardly therefrom, a plurality of transverse grids axially spaced along said thimble for supporting an array of upstanding fuel rods, and a top nozzle subassembly removably mounted on the upper end of said guide thimble for obtaining top access to said fuel rods upon removal thereof, said top nozzle subassembly comprising:
   (a) a section integrally formed on the upper end of said guide thimble and having external threads thereon;
   (b) a lower adapter plate having a guide thimble hole for receiving said guide thimble so as to mount said adapter plate on said guide thimble for slidable movement therealong;
   (c) a retainer mounted on said guide thimble for restably supporting and limiting the downward movement of said adapter plate along said guide thimble;
   (d) an upper hold-down plate having a guide thimble passageway with an internal ledge for receiving said thimble so as to mount said hold-down plate on said thimble for slidable movement therealong;
   (e) spring means interposed between said upper hold-down plate and said lower adapter plate for biasing said hold-down plate upwardly when a downward force is applied thereon whereby said downward force is yieldably transmitted to said fuel assembly;
   (f) a collar disposed within said passageway and in abutment with said ledge, said collar having an internally threaded section threadably engageable with said externally threaded section on said guide thimble upper end to move said hold-down plate down against said spring means and thereby mounting of said subassembly on said guide thimble; and
   (g) locking means to prevent relative rotation of said collar on said upper end of said guide thimble, said locking means including a portion of said upper end of said guide thimble which projects above said collar, said portion being bent over into engagement with a top surface of said collar.

7. A fuel assembly for a nuclear reactor including a bottom nozzle, at least one longitudinally extending control rod guide thimble having an upper end and a lower end being attached to the bottom nozzle and projecting upwardly therefrom, a plurality of transverse grids axially spaced along said thimble for supporting an array of upstanding fuel rods, and a top nozzle subassembly removably mounted on the upper end of said guide thimble for obtaining top access to said fuel rods upon removal thereof, said top nozzle subassembly comprising:
   (a) a section integrally formed on the upper end of said guide thimble and having external threads thereon;
   (b) a lower adapter plate having a guide thimble hole for receiving said guide thimble so as to mount said adapter plate on said guide thimble for slidable movement therealong;
   (c) a retainer mounted on said guide thimble for restably supporting and limiting the downward movement of said adapter plate along said guide thimble;
   (d) an upper hold-down plate having a guide thimble passageway with an internal ledge for receiving said thimble so as to mount said hold-down plate on said thimble for slidable movement therealong;
   (e) spring means interposed between said upper hold-down plate and said lower adapter plate for biasing said hold-down plate upwardly when a downward force is applied thereon whereby said downward force is yieldably transmitted to said fuel assembly;
   (f) a collar disposed within said passageway and in abutment with said ledge, said collar having an internally threaded section threadably engageable with said externally threaded section of said guide thimble upper end to move said hold-down plate down against said spring means and thereby mounting of said subassembly on said guide thimble; and (g) rotatable means on said collar to enable said collar to be rotated in one direction for threadable engagement with said guide thimble and rotated in an opposite direction to threadably disengage said collar from said guide thimble.

* * * * *